No. 697,615. Patented Apr. 15, 1902.
A. A. FLAGG.
HAND CHOPPING KNIFE.
(Application filed May 19, 1897.)
(No Model.)
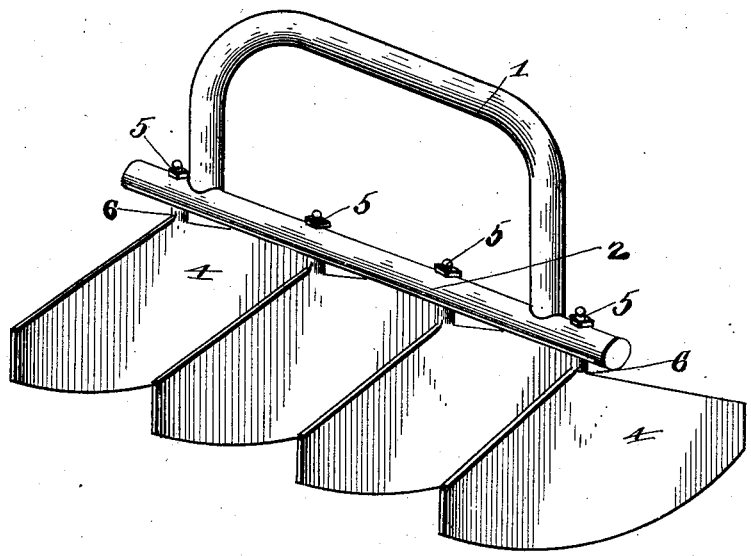
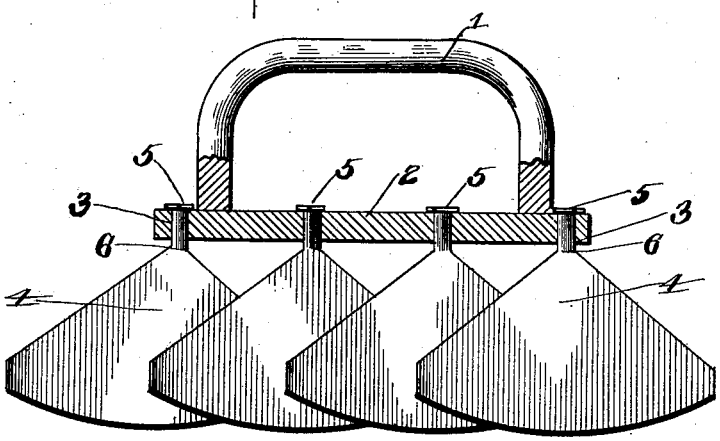
Witnesses
Geo. W. Pyne
Victor J. Evans.
Inventor
Alice A. Flagg.
By John Wedderburn, Attorney

UNITED STATES PATENT OFFICE.

ALICE A. FLAGG, OF JEFFERSONVILLE, VERMONT.

HAND CHOPPING-KNIFE.

SPECIFICATION forming part of Letters Patent No. 697,615, dated April 15, 1902.

Application filed May 19, 1897. Serial No. 637,184. (No model.)

*To all whom it may concern:*

Be it known that I, ALICE A. FLAGG, of Jeffersonville, in the county of Lamoille and State of Vermont, have invented certain new and useful Improvements in Hand Chopping-Knives; and I do hereby declare the following to be a full, clear, and exact description of the invention, such as will enable others skilled in the art to which it appertains to make and use the same.

The invention relates to a chopping-knife adapted for use by hand in chopping meats, &c.; and it consists in the combination, with the handle, of a series of chopping-blades connected with said handle in such manner as to adapt them to be arranged in parallel relation to each other or to be folded in substantially the same plane, thereby forming a simple and effective knife for use and one adapted to be folded into compact shape when not required for use. It will be understood from the following description and claims, reference being had to the accompanying drawings, in which—

Figure 1 is a perspective view of a chopping-knife, showing the improvement. Fig. 2 represents a longitudinal section through the handle-bar, showing the manner of securing the cutters thereto, with the latter folded into substantially the same plane.

1 indicates the handle of the chopping-knife, which may be of any usual or suitable construction. It is shown in the present instance made in loop or U shape, with the ends of its arms connected rigidly with a longitudinally-arranged bar 2; but it will be apparent that said bar 2 may be connected with the ordinary T-shaped handle centrally arranged on said bar 2. The bar 2 is provided with a number of perforations to receive a shank 3, formed on the upper edges of a series of cutters 4 4, said shanks being screw-threaded upon their upper ends to receive suitable washers and nuts 5 for holding the blades securely in place in the bar 2. Below the bar the shanks may be provided with collars or shoulders (indicated at 6) to abut against the lower face of the bar. The cutters 4 may be of any usual or desired form, preferably rounded on their lower edges, as in the ordinary construction.

In the use of the chopper the blades will be set ordinarily at right angles to the bar 2 and in parallel relation to each other, as shown in Fig. 1. By their pivotal connection with the bar 2, however, they may be adjusted at any desired angle of relation to said bar and when not in use may be folded one against another into substantially the same plane and into substantial parallel relation with the bar 2, varying therefrom only in the lapping of one blade or cutter upon another.

The construction described provides a simple and effective chopping-knife, one in which the cutters can be readily removed for cleaning or sharpening and as readily replaced and secured in the handle for use, as described. When the chopping-knife is not in use, the cutters or blades will be folded into compact shape, as indicated.

Having thus described my invention, what I claim as new, and desire to secure by Letters Patent, is—

1. A hand chopping-knife comprehending a bar provided with a suitable radially or laterally extending handle, and a plurality of cutting-blades pivotally mounted, at intervals, in said bar and extending in a direction opposite said handle.

2. A hand chopping-knife comprehending a bar provided with a laterally-extending handle, a plurality of cutting-blades provided with screw-threaded shanks, said shanks being pivotally mounted in said bar, and clamping-nuts on said shank, whereby said knives are adapted to be pivotally adjusted and secured in adjusted position.

In testimony whereof I have signed this specification in the presence of two subscribing witnesses.

ALICE A. FLAGG.

Witnesses:
MARION L. GRISWOLD,
WILLARD H. GRISWOLD.